United States Patent [19]

Kubotera et al.

[11] 3,870,479

[45] Mar. 11, 1975

[54] LITHOGRAPHIC TYPE DIFFUSION TRANSFER DEVELOPER

[75] Inventors: Kikuo Kubotera; Shinpei Ikenoue; Eiichi Mizuki, all of Saitama; Tadahiro Fujiwara, Kanagawa, all of Japan

[73] Assignee: Fuji Photo Film Co., Ltd., Kanagawa, Japan

[22] Filed: Oct. 13, 1972

[21] Appl. No.: 297,559

[30] Foreign Application Priority Data

Oct. 15, 1971 Japan .......................... 46-81378

[52] U.S. Cl. ........................ 96/29 L, 96/66.4, 96/56

[51] Int. Cl. ............................................. G03c 5/30

[58] Field of Search ............ 96/29 L, 66.4, 56, 66 R

[56] References Cited

UNITED STATES PATENTS

| | | | |
|---|---|---|---|
| 2,728,661 | 12/1955 | Thirtle et al. | 96/56 |
| 3,041,170 | 6/1962 | Haist | 96/95 |
| 3,512,981 | 5/1970 | Pechal et al. | 96/66.4 |
| 3,658,527 | 4/1972 | Kunz et al. | 96/29 |
| 3,721,563 | 3/1973 | Fisch et al. | 96/56 |

*Primary Examiner*—Ronald H. Smith
*Assistant Examiner*—John L. Goodrow
*Attorney, Agent, or Firm*—Sughrue, Rothwell, Mion, Zinn & Macpeak

[57] ABSTRACT

A lithographic type diffusion transfer developer for use in the diffusion transfer developing of a light-sensitive silver halide material, which comprises incorporating at least one of ascorbic acid, an ascorbic acid derivative or a water-soluble alkali salt thereof in a developer containing as the developing agent 1-phenyl-3-pyrazolidone-polyhydroxybenzene or p-aminophenol-polydroxybenzene, the developer further including a silver complexing agent.

19 Claims, 1 Drawing Figure

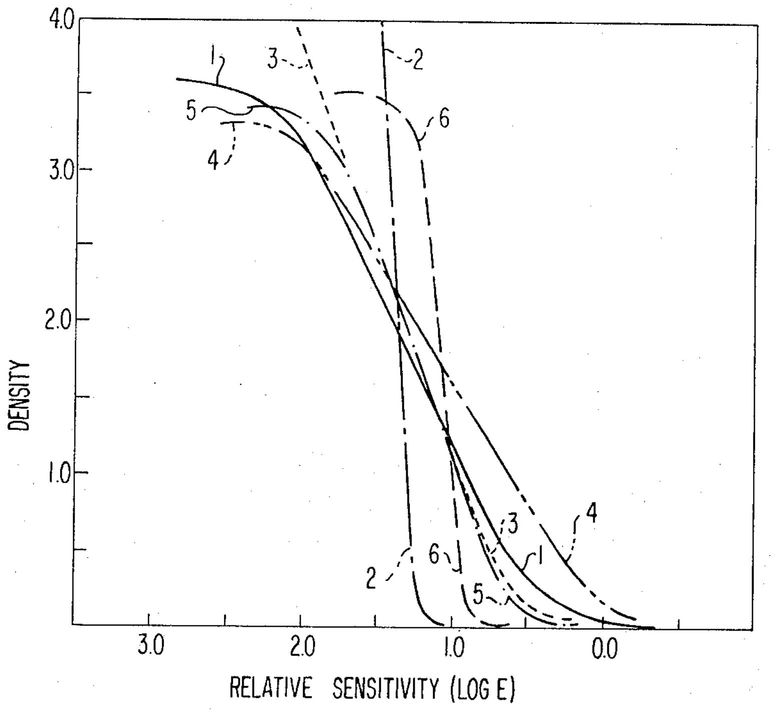
4.0
3.0
2.0
1.0
DENSITY
3.0
2.0
1.0
0.0
RELATIVE SENSITIVITY (LOG E)
1
2
3
4
5
6

LITHOGRAPHIC TYPE DIFFUSION TRANSFER DEVELOPER

BACKGROUND OF THE INVENTION

1. Field of the Invention

The present invention relates to a developer for an exposed silver halide light-sensitive material and, more particularly, it relates to a lithographic type diffusion transfer developer for an extremely high contrast silver salt diffusion transfer light-sensitive material.

2. Description of the Prior Art

In the prior art of photographic plate-making, it is necessary to convert the continuous gradation of the original to a halftone dot gradation. According to the standard method commonly practiced at present, an original having continuous gradation is printed on a high contrast lithographic light-sensitive material through a screen, and then lithographic type development is conducted accompanied by infectious development to thereby prepare a photographic original plate of a halftone negative or a halftone positive comprising hard dots.

However, in the method of conducting lithographic development using a lithographic light-sensitive material, a halftone negative is obtained from a positive original while a halftone positive is obtained from a negative original. Such a method is called a negative-positive method, and a positive halftone dot original plate or negative halftone dot original plate cannot be directly obtained from a positive original or a negative original. On the other hand, the positive-postive method requires an intermediate half-tone dot negative, and the resulting half-tone dot image is then converted to a positive.

If the preparation of an intermediate negative could be omitted and a halftone dot photographic original plate prepared directly from the original, it would be economically advantageous and simplify this type of process.

SUMMARY OF THE INVENTION

It is, therefore, an object of the present invention to provide a developer to prepare a halftone dot photographic original plate directly from the original employing the diffusion transfer developing method.

Another object of the invention is to provide a method for inhibiting the hardening of a negative emulsion layer with quinone, thus providing a good delaminating property from the positive image-receiving layer.

Yet another object of the invention is to provide a diffusion transfer developer with which a halftone dot picture having excellent dot quality, particularly having no fringe, can be directly obtained by the positive-positive method and diffusion transfer development.

The above-described objects have been attained by using a sulfite-free lithographic type diffusion transfer developer containing ascorbic acid or an ascorbic acid derivative.

That is, the present invention relates to a photographic developer for use in the diffusion transfer developing method using a silver halide light-sensitive material, which comprises incorporating ascorbic acid or ascorbic acid derivative or a water-soluble alkali salt thereof in a developer.

BRIEF DESCRIPTION OF THE DRAWINGS

FIG. 1 is a graph showing the characteristic curve of the lithographic type diffusion transfer developers in Example 1 of the invention, numerals 1 – 6 being the prescription No. of the developers in Example 1.

DETAILED DESCRIPTION OF THE INVENTION

In prior methods of silver salt diffusion transfer development, a silver image is formed by chemical development from the latent image of silver halide formed by exposure, and thus an image negative to the original is formed. The unexposed silver halide is reacted with a silver salt dissolving agent to form a soluble silver complex compound, which diffuses into an image-receiving layer and comes into contact with a nuclei material for physical development existing therein and is material for physical development existing therein and is reduced therewith to metal silver to form a positive image.

When the method of diffusion transfer development is applied to the case of breaking an original directly into dots using a screen, only a silver dot image comprising extremely soft dots can be obtained. In addition, as can be expected from the principles of photographing halftone dots, the light pattern of the halftones of the screen is of a mountain-shape, that is, the light is the strongest at the center, becomes weak at the edges, and changes continuously in brightness therebetween. In addition, since a photographic light-sensitive material originally has the property of expressing intermediate density as well as the maximum density and minimum density (fog) necessary to form halftone dots, as is naturally expected, a silver image is formed in conformity with the light pattern. Therefore, the halftone dots become lower in density as they deviate from the center to the edges and, usually, portions having a density gradation inconvenient for the plate-making are formed. Thus, it has been impossible to prepare a photographic halftone dot original plate from a diffusion transfer photographic light-sensitive material by the diffusion transfer development processing.

However, it has now been found that, when the lithographic type diffusion transfer developer in accordance with the present invention is used, the photographic characteristic of expressing an intermediate density region as described above is removed, that the silver positive image markedly increases in contrast, and that there is caused a reduction in the exposure range of the toe-part of the sensitivity curve (sharp toe-gradation). As a result, the resulting halftone dot image has a density far thicker than an usual halftone dot image and, in addition, the dot image contains no fringe and the hard dot silver halftone image as can be obtained by the lithographic development can be obtained. Thus, a good halftone dot photographic original plate can successfully be prepared by covering the original having continuous gradation directly with a screen.

The prior art of adding ascorbic acid or ascorbic acid derivatives to a lithographic developer to improve dot quality, particularly fringe, and to improve the preservability of the developer, is described in Japanese Pat. No. 28673/69, U.S. Pat. No. 3,512,981, and the like. However, in the present invention such materials are added to a silver salt diffusion transfer developer.

In addition, as examples of adding ascorbic acid to a diffusion transfer developer, diffusion transfer developers are known wherein ascorbic acid along is used as a developing agent in order to prevent stain by the developing agent remaining in the light-sensitive material after development processing (U.S. Pat. Defensive Publication No. T869,012), developers where ascorbic acid or ascorbic acid ketal is added in order to obtain a low contrast negative transfer image capable of being re-used together with a positive transfer image having normal photographic gradation (Japanese Pat. No. 21712/69), and like disclosures. The present invention is completely different from such prior art in its objects in that the main point of the present invention is the discovery of a novel effect different from those so far known with respect to ascorbic acid. More specifically, as described before, a conventional diffusion transfer developer contains a large amount (50 – 100 g/liter) of sulfite ion and a small amount (1 – 5 g/liter) of alkali bromide. In addition, with respect to photographic characteristics, a conventional diffusion transfer developer has been so designed as to express intermediate density regions with low contrast. Therefore, if halftone dot photography is directly conducted by covering the original with a screen, intermediate density regions, called fringe, will be formed around the halftone dot image.

On the other hand, as the developer for preparing a halftone dot photographic original plate for printing using a lithographic type light-sensitive material (or other contrasty light-sensitive material), there has usually been used a lithographic type infectious developer. In such a lithographic developer; (1) hydroquinone is present as a developing agent; (2) an aldehyde-alkali hydrogen sulfite adduct, an acetone-soluble sulfite adduct, etc., are used in combination therewith; (3) a small amount of alkali bromide is present; and (4) development is conducted using an alkaline developer having a pH less than about 10.5. Accordingly, in such a lithographic developer, hydroquinone alone is the developing agent and, in addition, the presence of free alkali bromide and sulfite ions in a small amount is extremely important.

However, the lithographic type diffusion transfer developer in accordance with the present invention is characterized in that: (1) a developing agent comprising a 1-phenyl-3-pyrazolidone-polyhydroxybenzene system or a p-methylaminophenol-polyhydroxybenze system is used; (2) the pH is as high as from about 9.5 to about 13.5, preferably from 10.5 to 13.5; (3) sulfite ion and (4) alkali bromide are not present at all, or are present in an extremely small amount (less than the amount in the conventional lithographic developer) since even a slight amount of sulfite ion and alkali bromide would accelerate development to make the contrast of the image low; and, further, (5) ascorbic acid or a derivative thereof is added thereto. It can thus be seen that the development of the present invention is completely different from the conventional lithographic development or diffusion transfer development.

Furthermore, another novel feature of the present invention is that in the diffusion transfer developer in accordance with the present invention containing ascorbic acid the sensitivity at the positive image portion is significantly increased and hardening of the negative emulsion layer by the hydroquinone oxidation product (quinone) is prevented. As a result, delamination of the negative emulsion layer is made easy. These facts were not known in the prior art and are main points of the present invention. What is more, the preservability of the developer is improved.

The characteristics of the lithographic type diffusion transfer developer to be used in the invention are that ascorbic acid, an ascorbic acid derivative or a salt thereof is added to a generally used diffusion transfer developer containing neither sulfite ion nor alkali bromide or containing them in an amount not exceeding 1 g/liter, respectively, wherein 1-phenyl-3-pyrazolidone or p-methylaminophenol and a polyhydroxybenzene are contained as the major component, and further, where a silver complexing agent is added. An alkali pH-adjusting agent can be added thereto if the pH value of the final developer is below 9.5.

As the developing agent, the combined use of 1-phenyl-3-pyrazolidone or p-aminophenol and polyhydroxylbenzene is particularly prefered.

The 1-phenyl-3-pyrazolidone type developer preferably used in the present invention include those such as 1-phenyl-3-pyrozolidone, and those having, on the phenyl moiety, one or more substitutents, such as for example an alkyl group such as a methyl group, and alkoxy group such as a methoxy group, an amino group, an acetoamide group, a hydroxyalkyl group such as a hydroxyethyl group, a hydroxy group, as well as those having on the pyrazolidone nucleus, substitutents such as, for example, an alkyl group such as a methyl group, an ethyl group, a propyl group and the like, an aryl group such as a phenyl group, an acyl group such as an acetyl group, a chloroacetyl group, a benzoyl group, a nitrobenzoyl group, etc.

Specific examples of such materials include 1-p-totyl-3-pyrazolidone, 1-phenyl-4-methyl-3-pyrazolidone, 1-phenyl-2-benzoyl-3-pyrazolidone, 1-p-chlorophenyl-3-pyrazolidone, 1-phenyl-5-phenyl-3-pyrazolidone, 1-m-tolyl-3-pyrazolidone, 1-phenyl-5-methyl-3-pyrazolidone, 1-p-tolyl-5-phenyl-3-pyrazolidone, 1-m-tolyl-3-pyrazolidone, 1-p-methoxy-phenyl-3-pyrazolidone, 1-acetamidophenyl-3-pyrazolidone, 1-phenyl-2-acetyl-4,4-dimethyl-3-pyrazolidone, 1-phenyl-4,4-dimethyl-3-pyrazolidone, 1-m-aminophenyl-4-methyl-4-propyl-3-pyrazolidone, 1-o-chlorophenyl-4-methyl-4-ethyl-3-pyrazolidone, 1-m-acetamidophenyl-4,4-diethyl-3-pyrazolidone, 1-(p-β-hydroxyethylphenyl)-4,4-dimethyl-3-pyrazolidone, 1-p-hydroxyphenyl-4,4-dimethyl-3-pyrazolidone, 1-p-tolyl-4,4-dimethyl-3-pyrazolidone, 1-(p-β-hydroxyethylphenyl)3-pyrazolidone, 1-o-tolyl-3-pyrazolidone, 1-o-tolyl-4,4-dimethyl-3-pyrazolidone, 1-phenyl-2-p-nitrobenzoyl-3-pyrazolidone, 1-phenyl-2-acetyl-3-pyrazolidone, 1-phenyl-2-chloro-acetyl-3* -pyrazolidone, 1-phenyl-2-acetyl-4-methyl-3-pyrazolidone, 1-p-tolyl-2-acetyl-3-pyrazolidone, 1-p-chlorophenyl-2-acetyl-3-pyrazolidone and the like.

The term silver complexing agent as is used in the present invention can be any compound which is reactive with unexposed silver halide to form a silver complex compound which is soluble or diffusible in an alkaline aqueous solution at pH greater than 9.5. Examples of the silver complexing agent which can be used in the present invention include an alkali metal thiosulfate or thiocyanate such as sodium or potassium thiosulfate or thiocyanate; ammonium thiosulfate or thiocyanate; alkali selenocyanats; thioglycerol; aminoethanethiols and the like. Such materials are well known to the art, and they may be used either singly or as mixtures thereof.

In general, sodium thiosulfate is used as a silver complexing agent and an extremely small amount of potassium serves as the halide present.

The lithographic type diffusion transfer developer of the present invention may be described in summary form as follows:

| | General Operating Proportions (g/l) | Preferred Operating Proportions (g/l) |
|---|---|---|
| a) Mandatory Components | | |
| o Developing Agent | | |
| 1-Phenyl-3-Pyrazolidones or p-Aminophenols | 0.01 to about 10 | 0.5 – 5 |
| Polyhydroxybenzenes | about 1 to about 50 | 3– 15 |
| o Ag Complexing Agent | about 1 to about 50 | 5 – 25 |
| o Ascorbic Acids | about 1 to about 100 | 5 – 30 |
| b) Optional Components | | |
| o Alkali Agent | 0 to about 200 | 0 – 50 |
| o Preservative | 0 to about 50 | 0 – 5 |
| o Retardant or Inhibitor | 0 to about 10 | 0 – 3 |
| c) Preferred Optional Components | | |
| o Antifoggant | 0 to about 10 | 0 – 3 |

The alkali pH-adjusting agent includes an alkali metal hydroxide such as potassium hydroxide, lithium hydroxide, sodium hydroxide or an alkali carbonate such as sodium carbonate, potassium carbonate, and the like. The preferred agent is sodium hydroxide. Other equivalent alkaline pH adjusting agents as are known to the art may also be used either singly or is mixtures.

Furthermore, if desired, an antifoggant, preservative, inhibitor surface active agent, sodium hexamethaphosphate, ethylenediaminetetraacetic acid or like water softeners, or other additives usually in photographic developer can be added.

Examples of suitable preservatives are sulfites such as sodium sulfite, sodium hydrogen sulfite, and the like.

Examples of suitable inhibitors are potassium bromide, sodium bromide, and the like.

Examples of suitable antifoggants are benzotriazole, benzothiazole, 1-phenyl-5-mercaptotetrazole, 2-mercaptobenzothiazole and the like.

As the water-soluble alkali salt of ascorbic acid, araboascorbic acid or derivatives thereof (the water-soluble alkali salt such as an alkali metal salt or an ammonium salt to be used in the invention) there are illustrated sodium salts, potassium salts, ammonium salts, lithium salts and like salts. These compounds are usually used in an amount of from about 1 to about 100 g per 1 liter of the diffusion transfer developer, most preferably 5 – 50 g/liter.

As ascorbic acid compounds, there are known, for example, 6-deoxy-L-ascorbic acid, L-erythroascorbic acid, L-glucoascorbic acid, D-glucoascorbic acid, D-galactoascorbic acid, L-araboascorbic acid, sorboascorbic acid, and like compounds.

Araboascorbic acid is particularly preferred as it exhibits an excellent short toe effect, provides good preservability to the developing solution and provides an excellent peel-off property to the emulsion layer.

The developer may be used in the form of liquid developer, a concentrated liquid developer containing hydrophilic resin or as a powdery developer. Furthermore, the developer may be incorporated into the light-sensitive material. For example, about 15 g of hydroquinone may be used per 1 kg of the emulsion.

The light-sensitive material to be used in the present invention may be used in the form wherein the image-receiving layer containing the silver diffusion transfer nuclei and the silver halide light-sensitive material are separated, or in the form of multi-layer light-sensitive material wherein the light-sensitive silver halide is directly coated onto the image-receiving layer.

As the light-sensitive silver halide emulsion layer, those publicly known can be employed, but preferred emulsions are those wherein the exposed silver salt can be developed in the diffusion transfer developing step with sufficient speed while the unexposed silver salt can form a complex compound with enough speed and can be rapidly reduced in the image-receiving layer.

The emulsion is preferably one as is used in lithographic light-sensitive materials which yield a hard tone image. The most preferred emulsion contains silver chlorobromide comprising from 70 to 80 mol % silver chloride.

As the silver halide, those generally used such as silver chloride, silver bromide, silver iodide, silver chlorobromide, silver chloroiodide, silver chlorobromoiodide or the like halides can be used.

As the binder, gelatin is primavily used, but other hydrophilic colloid may also be employed. The proportion of silver halide to the binder is preferably large and, particularly, a proportion of about 0.4 to about 0.6% by weight of the binder based on the silver halide is advantageous for obtaining a hard-dot halftone image.

To the silver halide emulsion there may be added, if desired, various sensitizers such as sulfur sensitizer, gold sensitizer and like chemical sensitizers known to the art, sensitizing dyes such as cyamine dyes, merocyanine dyes or derivatives thereof, antifoggants such as imidazoles, triazoles, pyrazoles and the like, surface active agents such as monylphenyl ether, sodium dodecylsulfate, a sodium alkylbenzene sulfonate, for example, sodium dodecylbenzene sulfonate etc., and other normally used additives. These additives are described in detail by C.E. Kenneth Mees, *The Theory of The Photographic Process*, Third Edition. In particular, an emulsion having contrasty characteristics is preferred.

As the medium of the image-receiving layer wherein the nuclei material for the physical development is dispersed, any of those which have so far been employed in this field can be used. Suitable examples of the medium include hydrophilic high molecular weight compounds such as gelatin, gelatin derivatives, e.g., phthalated gelatin, gum arabic, and alkali metal alginate, hydroxyethyl cellulose, methyl cellulose, carboxymethyl cellulose, polyacrylamide, polyvinylpyrrolidone, or copolymers thereof, polyvinylalcohol or a derivative thereof, such materials may be used alone or as combinations thereof.

The materials serving as the muclei are also those commoly used, and include colloidal silver, silver sulfide, nickel sulfide, zinc sulfide, sodium sulfide, colloidal sulfur, thiosinamine, stannous chloride, chloroauric acid, etc.

The developer in accordance with the present invention provides a silver image having excellent dot characteristics with no intermediate density between dots. The halftone positive silver image thus prepared can be used as a halftone dot photographic original plate directly printable onto an offset printing plate, a fat sensitization-processed printing plate, or a PS plate (i.e., presensitized plate) and, in addition, it can be advantageously used in all photographic processes requiring high contrast.

The present invention will now be explained in greater detail below by reference to the following non-limitative Examples.

EXAMPLE 1

A polyethylene terephthalate film 0.18 mm thick was surface treated by irradiation with ultraviolet rays. Then an antihalation layer was applied to one side of the film, and a gelatin organic solvent dispersion having the following composition applied to the other side and then dried at 120°C for 2 minutes to form an intermediate layer 0.2 microns thick.

| | |
|---|---|
| Gelatin | 1 g |
| Water | 1 g |
| Acetic acid | 1 g |
| Methanol | 20 g |
| Acetone | 60 g |
| Methylene chloride | 10 g |
| Tetrachloroethane | 5 g |
| Phenol | 5 g |

An aqueous gelatin solution containing nuclei materials having the following composition was applied to the intermediate layer and dried at 60° C for 60 minutes to form a hydrophilic diffusion transfer image-receiving layer 0.5 microns thick.

| | | |
|---|---|---|
| Nickel sulfide gelatin dispersion | | 0.4 g |
| Nickel sulfide | $5 \times 10^{-4}$ wt.% | |
| Gelatin | 0.5 wt.% | |
| Gelatin | | 0.4 g |
| Water | | 100 g |
| 1% Aqueous solution of sodium dodecylbenzenesulfonate | | 0.4 g |
| 1% Aqueous solution of chromium acetate | | 5 g |

To the image-receiving layer thus formed was applied a panchromatically sensitized high contrast lighographic non-hardened gelatino-silver chlorobromide (silver chloride content: 70% by weight, containing 1 mol of silver per 1 kg of the emulsion) at a thickness of 6 micron. This layer was then dried. Furthermore, as a protective layer a 1% by weight aqueous gelatin solution was applied thereto at a thickness of 1 micron and dried to prepare a light-sensitive material.

The resulting light-sensitive material was subjected to step wedge exposure using a 30 watt tungsten lamp (18 volts) at a distance of 1 m for 2 seconds and then development processing was conducted in each of the six diffusion transfer developers having the compositions shown in Table 1 below for 1 minute. After washing with 30° C water, the emulsion layer was removed to thereby prepare a positive image formed of silver. The samples thus obtained were compared. The photographic characteristics obtained as a result of development are given in Table 2 and in FIG. 1.

TABLE 1

| Compositions of the developer / Prescription No. | 1 | 2 | 3 | 4 | 5 | 6 |
|---|---|---|---|---|---|---|
| Distilled water (cc) | 750 | 750 | 750 | 750 | 750 | 750 |
| p-Methylaminophenol (g) | — | — | — | 2 | 2 | 2 |
| 1-Phenyl-3-pyrazolidone (g) | 2 | 2 | 2 | — | — | — |
| Hydroquinone (g) | 15 | 15 | 15 | 15 | 15 | 15 |
| Anhydrous sodium thiosulfate (g) | 15 | 15 | 15 | 15 | 15 | 15 |
| Anhydrous sodium sulfite (g) | 80 | — | — | 80 | — | — |
| Sodium hydroxide (g) | 20 | 20 | 20 | 20 | 20 | 20 |
| Ascorbic acid (g) | — | 10 | — | — | — | 10 |
| Water to make the total 1 liter. | | | | | | |

TABLE 2

| Photographic characteristics / Prescription No. | 1 | 2 | 3 | 4 | 5 | 6 |
|---|---|---|---|---|---|---|
| Gamma (γ) | 2.0 | 14.0 | 2.6 | 1.6 | 2.6 | 9.0 |
| Maximum density (D) | 3.6 | above 4.0 | above 4.0 | 3.3 | 3.4 | 3.5 |
| Sensitivity (relative exposure amount providing (fog + 0.1)) | $\bar{1}.80$ | $\bar{2}.80$ | $\bar{1}.58$ | 0.10 | $\bar{1}.54$ | $\bar{1}.15$ |
| Toe-gradation | 0.45 | 0.05 | 0.30 | 0.40 | 0.30 | 0.05 |
| Fog density | 0.02 | 0.01 | 0.05 | 0.03 | 0.03 | 0.01 |

The above photographic characteristics were determined in accordance with the procedures described in C.E.K. Mees, *The Theory of the Photographic Process*, Third Edition, page 409–449.

From the results above, it can be seen that the sulfite and alkali bromide-free diffusion transfer developer containing ascorbic acid (Prescription Nos. 2 and 6) provided an extremely high gamma value and good toe-gradation (a logarithm of the exposure amount required to obtain an optical density of 0.1 – 0.5). Furthermore, in the halftone dot silver image obtained by exposing through a contact screen, the smaller the toe-gradation, the lower is the formation of fringe. Thus, extremely hard dots were obtained.

From the above results, it can be seen that the developer containing D-araboascorbic acid provides an extremely high gamma value and good toe-gradation similar to the developer of Prescription No. 2.

EXAMPLE 3

The dependence on the amount of sodium sulfite added was examined in the developer of Prescription No. 2 described in Example 1. The prescription of the developer and the photographic characteristics obtained as a result of development are shown in Tables 3 and 4, respectively. As the light-sensitive material, one having the same composition as in Example 1 was used.

TABLE 3

| Prescription No. / Composition of the developer | 2 | 8 | 9 | 10 | 11 | 12 | 13 |
|---|---|---|---|---|---|---|---|
| Distilled water (cc) | 750 | 750 | 750 | 750 | 750 | 750 | 750 |
| 1-Phenyl-3-pyrazolidone (g) | 2 | 2 | 2 | 2 | 2 | 2 | 2 |
| Hydroquinone (g) | 15 | 15 | 15 | 15 | 15 | 15 | 15 |
| Anhydrous sodium sulfite (g) | — | 0.1 | 0.5 | 1 | 2 | 5 | 10 |
| Anhydrous sodium thiosulfate (g) | 15 | 15 | 15 | 15 | 15 | 15 | 15 |
| Sodium hydroxide (g) | 20 | 20 | 20 | 20 | 20 | 20 | 20 |
| Ascorbic acid (g) | 10 | 10 | 10 | 10 | 10 | 10 | 10 |
| Water to make the total 1 liter. | | | | | | | |

TABLE 4

| Prescription No. / Photographic characteristics | 2 | 8 | 9 | 10 | 11 | 12 | 13 |
|---|---|---|---|---|---|---|---|
| Gamma ($\gamma$) | 14.0 | 13.0 | 12.0 | 10.0 | 8.0 | 6.0 | 6.0 |
| Maximum density (D) | above 4.0 | above 4.0 | above 4.0 | above 4.0 | above 4.0 | above 4.0 | above 4.0 |
| Sensitivity | $\bar{2}.80$ | $\bar{2}.85$ | $\bar{2}.92$ | $\bar{2}.92$ | $\bar{1}.00$ | $\bar{1}.20$ | $\bar{1}.20$ |
| Toe-gradation | 0.05 | 0.10 | 0.15 | 0.18 | 0.18 | 0.25 | 1.30 |
| Fog density | 0.01 | 0.01 | 0.01 | 0.01 | 0.01 | 0.01 | 0.01 |

EXAMPLE 2

A developer of the following prescription (No. 7, werein D-araboascorbic acid was used in place of ascorbic acid in the developer of Prescription No. 2 described in Example 1) was prepared and the same photographic material as was used in Example 1 was processed in the same manner as in Example 1.

| Prescription No. 7 | |
|---|---|
| DISTILLED WATER | 750 cc |
| 1-Phenyl-3-pyrazolidone | 2 g |
| Hydroquinone | 15 g |
| Anhydrous sodium thiosulfate | 15 g |
| Sodium hydroxide | 20 g |
| D-araboascorbic acid | 10 g |
| Water to make the total | 1 liter. |

The photographic characteristics obtained as a result of development are shown below.

| Photographic characteristics | |
|---|---|
| Gamma ($\gamma$) | 13 |
| Maximum density (D) | above 4 |
| Sensitivity | 2.90 |
| Toe-gradation | 0.05 |
| Fog density | 0.01 |

From the results shown in Table 4, it can be seen that in an alkali bromide-free developer containing ascorbic acid the gamma and the toe-gradation become poorer as the amount of sodium sulfite added increases, and the fringe around the silver halftone dot image increases when more than 1 g of sodium sulfite is added per 1 liter of the developer.

EXAMPLE 4

The dependence on the amount of potassium bromide was examined in place of sodium sulfite in the developer of Prescription No. 2 described in Example 1. The prescription of the developer and the photographic characteristics obtained as a result of development are shown in Tables 5 and 6, respectively. As the light-sensitive material, one having the same composition as in Example 1 was used.

TABLE 5

| Prescription No. / Composition of the developer | 2 | 14 | 15 | 16 | 17 | 18 |
|---|---|---|---|---|---|---|
| Distilled water (cc) | 750 | 750 | 750 | 750 | 750 | 750 |
| 1-Phenyl-3-pyrazolidone (g) | 2 | 2 | 2 | 2 | 2 | 2 |
| Hydroquinone (g) | 15 | 15 | 15 | 15 | 15 | 15 |
| Anhydrous sodium thiosulfate (g) | 15 | 15 | 15 | 15 | 15 | 15 |
| Sodium hydroxide (g) | 20 | 20 | 20 | 20 | 20 | 20 |
| Ascorbic acid (g) | 10 | 10 | 10 | 10 | 10 | 10 |
| Potassium bromide (g) | — | 0.1 | 0.5 | 1 | 2 | 5 |
| Water to make the total 1 liter. | | | | | | |

TABLE 6

| Prescription No. Photographic characteristics | 2 | 14 | 15 | 16 | 17 | 18 |
|---|---|---|---|---|---|---|
| Gamma (γ) | 14.0 | 14.0 | 12.0 | 12.0 | 10.0 | 0.8 |
| Maximum density (D) | above 4.0 | above 4.0 | above 4.0 | above 4.0 | above 4.0 | above 4.0 |
| Sensitivity | $\bar{2}$.80 | $\bar{2}$.90 | $\bar{1}$.00 | $\bar{1}$.00 | $\bar{1}$.15 | $\bar{1}$.20 |
| Toe-gradation | 0.05 | 1.10 | 0.20 | 0.20 | 0.35 | 0.35 |
| Fog density | 0.01 | 0.01 | 0.01 | 0.01 | 0.01 | 0.01 |

From the results given in Table 6, it can be seen that in a sulfite-free developer containing ascorbic acid the gamma and the toe-gradation become poorer as the amount of potassium bromide increases, and the fringe around the silver halftone dot image increases when more than 1 g of potassium bromide is added per 1 liter of the developer.

While the invention has been described in detail and with reference to specific embodiments thereof, it will be apparent to one skilled in the art that various changes and modification can be made therein without departing from the spirit and scope thereof.

What is claimed is:

1. A lithographic type diffusion transfer developer for use in the diffusion transfer developing of a light-sensitive silver halide material, which consists essentially of at least one of ascorbic acid, an ascorbic acid derivative or a water-soluble alkali salt thereof in a developer containing as the developing agent 1-phenyl-3-pyrazolidone-polyhydroxybenzene or p-aminophenol-polyhydroxybenzene, the developer further including a silver complexing agent, sulfite or alkali bromide being present in the developer in an amount of 0–1g per one liter of the developer, said developer providing a fringe-free half tone dot photographic original plate directly from an original, and providing increased sensitivity at the positive image portion of an image receiving layer when used in diffusion transfer development.

2. The developer of claim 1, wherein said ascorbic acid, ascorbic acid derivative or water-soluble alkali salt thereof is added in an amount of 1 – 100 g per 1 liter of developer.

3. The developer of claim 1, wherein 6-deoxy-L-ascorbic acid, L-erythroascorbic acid, L-glycoascorbic acid, D-glucoascorbic acid, D-galactoascorbic acid, L-araboascorbic acid or sorboascorbic acid is used as the ascorbic acid derivative.

4. The developer of claim 1, wherein a sodium salt, potassium salt, ammonium salt or lithium salt is used as the water-soluble alkali salt of ascorbic acid or the ascorbic acid derivative.

5. The developer of claim 1, wherein said developer is substantially free of sulfite or alkali bromide.

6. The developer of claim 1 at a pH of 9.5 to 13.5.

7. The developer of claim 1 where the developing agent is a 1-phenyl-3-pyrazolidone-polyhydroxybenzene.

8. The developer of claim 1 where the developing agent is a p-aminophenol-polyhydroxybenzene.

9. The developer of claim 1 wherein, per liter of developer there is present: 0.1 to about 10 g phenyl-3-pyrazoledone and/or p-aminophenol; about 1 to about 50 g polyhydroxybenzene, about 1 to about 50 g silver complexing agent about 1 to about 100 g ascorbic acid or alkali salt thereof.

10. A lithographic type diffusion transfer developer as described in claim 1, wherein said developing agent 1-phenyl-3-pyrazolidone is a member selected from the group consisting of 1-p-tolyl-3-pyrazolidone, 1-phenyl-4-methyl-3-pyrazolidone, 1-phenyl-2-benzoyl-3-pyrazolidone, 1-p-chlorophenyl-3-pyrazolidone, 1-phenyl-5-phenyl-3-pyrazolidone, 1-m-tolyl-3-pyrazolidone, 1-phenyl-5-methyl-3-pyrazolidone, 1-p-tolyl-5-phenyl-3-pyrazolidone, 1-m-tolyl-3-pyrozolidone, 1-p-methoxyphenyl-3-pyrazolidone, 1-acetamidophenyl-3-pyrazolidone, 1-phenyl-2-acetyl-4,4-dimethyl-3-pyrazolidone, 1-phenyl-4,4-dimethyl-3-pyrazolidone, 1-m-aminophenyl-4-methyl-4-propyl-3-pyrazolidone, 1-o-chlorophenyl-4-methyl-4-ethyl-3-pyrazolidone, 1-m-acetamido-phenyl-4,4-diethyl-3-pyrazolidone, 1-(p-β-hydroxyethylphenyl)-4,4-dimethyl-3-pyrazolidone, 1-p-hydroxyphenyl-4,4-dimethyl-3-pyrazolidone, 1-p-tolyl-4,4-dimethyl-3-pyrazolidone, 1-(p-β-hydroxyethylphenyl)-3-pyrazolidone, 1-o-tolyl-3-pyrazolidone, 1-o-tolyl-4,4-dimethyl-3-pyrazolidone, 1-(p-β-hydroxyethylphenyl)-3-pyrazolidone, 1-o-tolyl-3-pyrazolidone, 1-o-tolyl-4,4-dimethyl-3-pyrazolidone, 1-phenyl-2-p-nitrobenzoyl-3-pyrazolidone, 1-phenyl-2-acetyl-3-pyrazolidone, 1-phenyl-2-chloroacetyl-3-pyrazolidone, 1-phenyl-2-acetyl-4-methyl-3-pyrazolidone, 1-p-toly-2-acetyl-3-pyrazolidone and 1-p-chlorophenyl-2-acetyl-3-pyrazolidone.

11. A lithographic type diffusion transfer developer as described in claim 1, wherein said developing agent p-aminophenol is a member selected from the group consisting of p-methylaminophenol,2,3,6-trimethyl-p-aminophenol,2,3,5-trimethyl-p-aminophenol,2,3-dimethyl-6-methoxy-p-aminophenol. 2,6-dimethyl-p-aminophenol, 2-methoxy-6-methyl-p-aminophenol, 2-propoxy-p-aminophenol, 2,6-dimethoxy-p-aminophenyl, 2-ethoxy-6-methyl-p-aminophenol, 2-methyl-6-propyl-p-aminophenol-2-butoxy-p-aminophenol, 2-ethoxy-p-aminophenol, 2-methoxy-p-aminophenol and 4-benzylaminophenol, 2,4-diaminophenol.

12. A lithographic type diffusion transfer developer as described in claim 1, wherein said developing agent polyhydroxybenzene is a member selected from the group consisting of hydroquinone, catechol, chlorohydroquinone, pyrogallol, bromobydroquinone, isopropylhydroquinone, toluhydroquinone, methylhydroquinone, 2,3-dichlorohydroquinone, 2,5-dimethylhydroquinone and 2,3-dibromohydroquinone.

13. In a process for developing a latent lithographic type image transferred from an exposed silver halide light sensitive material to an image receiving layer containing development nuclei by a diffusion transfer process, the improvement wherein development is with a developer consists essentially of at least one of ascorbic acid, an ascorbic acid derivative or a water-soluble alkali salt thereof in a developer containing as the developing agent 1-phenyl-3-pyrazolidone-polyhydroxybenzene or p-aminophenol-polyhydroxybenzene, the developer further including a silver complexing agent, sulfite or alkali bromide being present in the developer in an amount of 0–1g per one liter of the developer, said developer providing a fringe-free half tone dot photographic original plate directly from an original, and providing increased sensitivity at the positive image portion of an image receiving layer when used in diffusion transfer development.

14. The process of claim 13, wherein said developer is substantially free of sulfite or alkali bromide.

15. The process of claim 13, wherein said ascorbic acid, ascorbic acid derivative or water-soluble alkali salt thereof is added in an amount of 1 – 100 g per 1 liter of developer.

16. The process of claim 13, wherein 6-deoxy-L-ascorbic acid, L-erythroascorbic acid, L-glycoascorbic acid, D-glucoascorbic acid, D-galactoascorbic acid, L-araboascorbic acid or sorboascorbic acid is used as the ascorbic acid derivative.

17. The process of claim 13, wherein a sodium salt, potassium salt, ammonium salt or lithium salt is used as the water-soluble alkali salt of ascorbic acid or the ascorbic acid derivative.

18. The process of claim 13, where the developing agent is a 1-phenyl-3-pyrazolidone-polyhydroxybenzene.

19. The process of claim 13, where the developing agent is a p-aminophenol-polyhydroxybenzene.

* * * * *